United States Patent
Imanishi

(10) Patent No.: US 7,454,126 B2
(45) Date of Patent: Nov. 18, 2008

(54) HARD DISK RECORDER HAVING TIME-SHIFT PLAYBACK FUNCTION

(75) Inventor: Kanji Imanishi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 939 days.

(21) Appl. No.: 10/614,949

(22) Filed: Jul. 8, 2003

(65) Prior Publication Data

US 2004/0008441 A1  Jan. 15, 2004

(30) Foreign Application Priority Data

Jul. 9, 2002  (JP) ............................. 2002-199516

(51) Int. Cl.
*H04N 5/00* (2006.01)

(52) U.S. Cl. ...................... 386/125; 386/124

(58) Field of Classification Search .................. 386/33, 386/35, 40, 45, 77, 83, 92, 109, 124, 46, 386/125

See application file for complete search history.

(56) References Cited

U.S. PATENT DOCUMENTS

| 5,852,474 | A | 12/1998 | Nakagaki et al. | |
|---|---|---|---|---|
| 6,748,481 | B1 * | 6/2004 | Parry et al. | 725/89 |
| 7,257,308 | B2 * | 8/2007 | Plourde et al. | 386/46 |
| 2003/0219234 | A1 * | 11/2003 | Burda | 386/124 |

FOREIGN PATENT DOCUMENTS

| JP | 9-65225 | 3/1997 |
|---|---|---|
| JP | 2001-326880 | 11/2001 |
| JP | 2002-44542 | 2/2002 |
| JP | 2002-158956 | 5/2002 |
| JP | 2003-264780 | 9/2003 |

OTHER PUBLICATIONS

Japanese Office Action mailed Nov. 30, 2004 in Japanese Patent Appln. No. 2002-199516 (2 pages), with English translation (2 pages).
Abstract of Japanese Patent No. 2002-158956 from esp @ cenet database, Publication Date May 31, 2002, 1 page.
Patent Abstracts of Japan, Publication No. 2003-264780 dated Sep. 19, 2003, 1 page.
Patent Abstracts of Japan, Publication No. 2001-326880 dated Nov. 22, 2001, 1 page.
Patent Abstracts of Japan, Publication No. 2002-044542, Feb. 8, 2002, 1 pg.
Patent Abstracts of Japan, Publication No. 09-065225, Mar. 7, 1997, 1 pg.

* cited by examiner

*Primary Examiner*—John W. Miller
*Assistant Examiner*—James A Fletcher
(74) *Attorney, Agent, or Firm*—Osha • Liang LLP

(57) ABSTRACT

A hard disk recorder has a time-shift playback function of storing, on an HDD, a program which is now being received, displaying the stored program, even if program-storing is still under way, in such a manner that the program is displayed from an arbitrary section of the program among program sections that have already been stored, and pausing the display of the program or changing the display speed according to an operation by a user while the program is being watched. A control unit sets, in response to a channel-switch instruction, the HDD in a pause state from which a storing operation can immediately be started, thereafter sets the HDD in a recording-wait state to switch the channel, and sets the HDD in a playback state according to a determination that the HDD is in a recording-wait state.

3 Claims, 4 Drawing Sheets

HARD DISK RECORDER HAVING TIME-SHIFT PLAYBACK FUNCTION

BACKGROUND OF THE INVENTION

1. Field of the Invention

The present invention relates to hard disk recorders. In particular, the present invention relates to a hard disk recorder having a time-shift playback function of storing a program which is now being received, displaying the stored program, even if program-storing is still under way, in such a manner that the program is displayed from an arbitrary section of the program among program sections that have already been stored, and pausing the display of the program or changing the display speed according to an operation by a user while the program is being watched.

2. Description of the Background Art

A hard disk recorder is disclosed as a TV program-watching device in Japanese Patent Laying-Open No. 2002-44542. Such a hard disk recorder was put into practical use as low-cost manufacturing of a large-capacity hard disk (hereinafter referred to as HDD) was achieved. The conventional video tape recorder (VTR) can perform only recording or playback at a time, and thus it cannot play back a recorded program until it completes recording of the program. On the other hand, the hard disk recorder has a feature that it can use the time-shift playback function to display a program, even if storing of the program on the HDD is under way, from an arbitrary section of the program among program sections that have already been stored. The hard disk recorder includes such a buffer as shown in FIG. 4 for successively storing information concerning selected programs. In the example shown in FIG. 4, the program information is stored in the order of channel 1, channel 2, external input, channel 1.

Regarding the already-proposed hard disk recorder, however, when the user switches the channel of the program which is being stored from channel 1 to channel 2, the user cannot watch already-stored contents of channel 1 any more, despite that information about the program which has been recorded is stored in the buffer. This is for the reason that a sector address of the HDD that indicates which section of the program is being played back is cleared and returned to a leading address and thus it cannot know which section of the program was lastly played back.

Therefore, when the program is being stored, switching of the channel or switching of the input source is inhibited or the time-shift playback function is stopped. Thus, the user is required to take care that the user never switches the channel or switches the input source when the time-shift playback function is effective. Moreover, the already-proposed hard disk recorder has a disadvantage that switching of the channel takes a considerable time.

FIG. 5 is a flowchart illustrating the conventional channel-switching operation. When an instruction to switch the channel is issued, a stop command is output from a control IC chip. This stop command includes a pause command in step SP (only shown as SP in the drawing) 1, an idle command in step SP2 and a stop command in step SP3. In step SP1, if the instruction is issued, the HDD is set in a pause state from which a program-storing operation can immediately be started, without stopping such a hardware structure as HDD. In step SP2, the HDD is set in a recording-wait state, namely idle state and then set in a stop state in step SP3. In step SP4, the channel switching operation is carried out.

In step SP5, it is determined whether or not playback of stored images by the HDD is possible. This determination is done according to a status of the control IC chip. If playback is possible, the control IC chip outputs a playback command. The playback command includes a stop command in step SP6, an idle command in step SP7 and a pause command in step SP8. According to the playback command, the HDD is set in a stop state in step SP6, in an idle state again in step SP7, and a pause state in SP8. Then, in step SP9, the playback operation is carried out.

In the conventional channel-switching operation, the stop command and the playback command from the control IC chip are used to completely stop the HDD before the channel is switched and make a transition to the playback state by operating the HDD. When the HDD is stopped, the sector address of the HDD is cleared and returned to a leading address. Therefore, it cannot know which section of the program was lastly played back before the channel was switched. There is a further problem that the channel switching operation takes several tens of seconds.

SUMMARY OF THE INVENTION

A chief object of the present invention is to provide a hard disk recorder capable of continuously storing programs without stopping the time-shift function even if the channel or the input source is switched and capable of speedily switching the channel.

According to one aspect of the present invention, a hard disk recorder has a time-shift playback function of storing a program which is now being received, displaying the stored program, even if program-storing is still under way, in such a manner that the program is displayed from an arbitrary section of the program among program sections that have already been stored, and pausing the display of the program or changing the display speed according to an operation by a user while the program is being watched. The hard disk recorder includes a hard disk for storing the program which is now being received, and a control unit responsive to a channel-switch instruction for setting the hard disk in a pause state from which a storing operation can immediately be started and thereafter setting the hard disk in a recording-wait state to switch the channel and, according to a determination that the hard disk is in the recording-wait state, setting the hard disk in a playback state.

According to another aspect of the present invention, a hard disk recorder is capable of storing a program which is now being received and displaying the stored program. The hard disk recorder includes a hard disk for storing the program which is now being received, and a control unit responsive to a channel-switch instruction for setting the hard disk in a pause state from which a storing operation can immediately be started and thereafter setting the hard disk in a recording-wait state to switch the channel and, according to a determination that the hard disk is in the recording-wait state, setting the hard disk in a playback state.

As discussed above, according to the present invention, in response to a channel-switch instruction, the hard disk is set in a pause state from which a storing operation can immediately be started, then set in a recording-wait state for switching the channel, and then set in a playback state according to a determination that the hard disk is in the recording-wait state. It is thus possible to continue storing of the program without stopping the time-shift playback function. Moreover, the time required for switching the channel that is conventionally several tens of seconds can remarkably be shortened to approximately 0.1 second.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
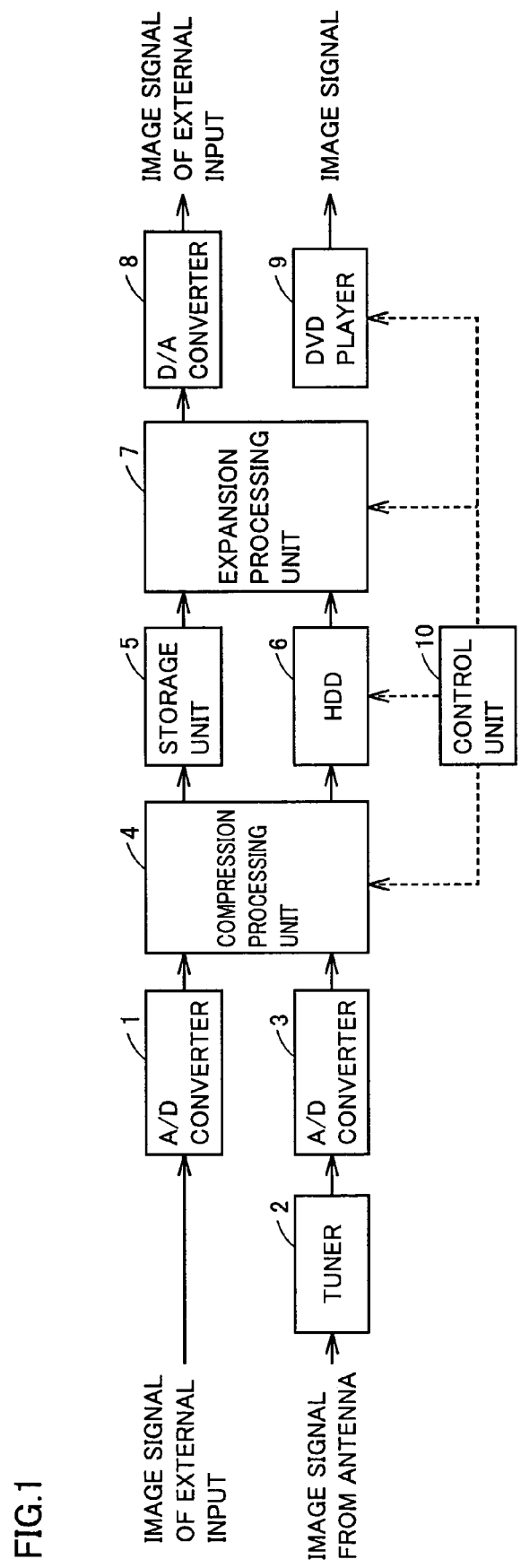
FIG. 1 is a block diagram of a hard disk recorder according to one embodiment of the present invention.

FIG. 1 is a block diagram of a hard disk recorder according to one embodiment of the present invention. Referring to FIG. 1, an image signal of an external input is converted by an A/D converter 1 into a digital signal and provided to a compression processing unit 4, and an image signal from an antenna is received by a tuner 2, converted by an A/D converter 3 into a digital signal and provided to compression processing unit 4. Compression processing unit 4 compresses the image signal for reducing the information amount of the image signal and the resultant signal is stored on HDD 6. A storage unit 5 constructed of a semiconductor memory and the like stores information concerning a program which is stored on HDD 6.

When the image signal stored on HDD 6 is read, information about the image signal is also read from storage unit 5 and provided to an expansion processing unit 7 where the original image signal of the program is subjected to expansion processing. Then, the image signal is converted by a D/A converter 8 into an analog signal and output to the outside. It is noted that the hard disk recorder includes a DVD player 9 and the image signal is also output from DVD player 9.

A control unit 10 controls compression processing unit 4, HDD 6, expansion processing unit 7 and DVD player 9 and further performs a channel switching operation.

Figure 2:
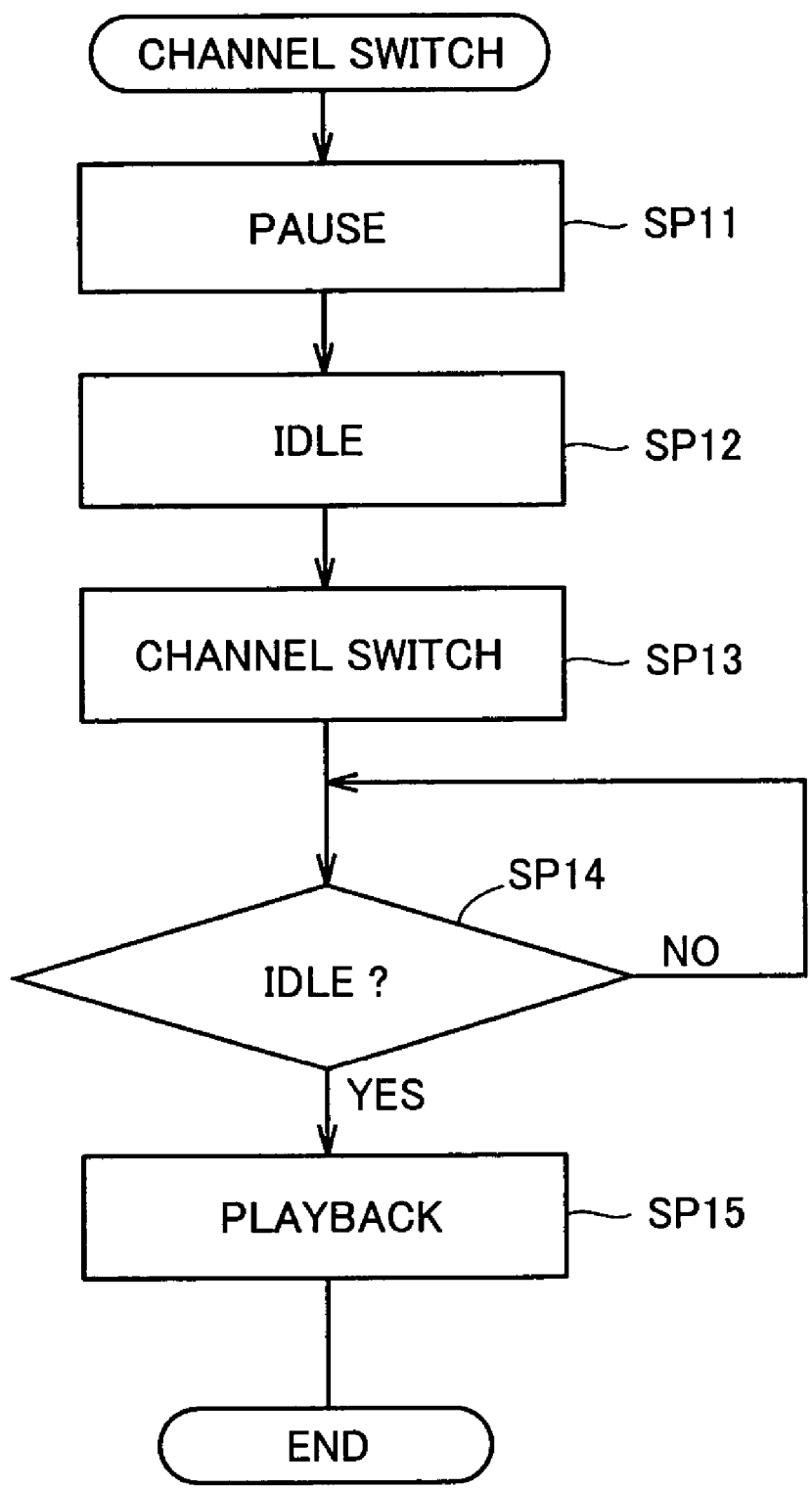
FIG. 2 is a flowchart illustrating a channel switching operation of the hard disk recorder according to the embodiment of the present invention.

FIG. 2 is a flowchart illustrating an operation of the hard disk recorder according to the embodiment of the present invention, and FIG. 3 shows a time sequence.

The flowchart shown in FIG. 2 illustrates an operation of allowing channel switching when HDD 6 is storing a program. When a channel-switch instruction is issued, control unit 10 immediately outputs a pause command, not the conventional stop command, in step SP 11, and accordingly the HDD is set in a pause state from which a program storing operation can immediately be started upon receiving a command without stopping such a hardware structure as HDD 6. In step SP12, control unit 10 sets the HDD in a recording-wait state, namely an idle state. After this, in step SP13, a channel switching operation is carried out.

In step SP14, it is determined whether or not HDD 6 is in an idle state. If HDD 6 is not in the idle state, the operation waits until HDD 6 enters the idle state. In step P14, when it is determined that the HDD is in the idle state, a playback operation is done in step 15.

Figure 3A:
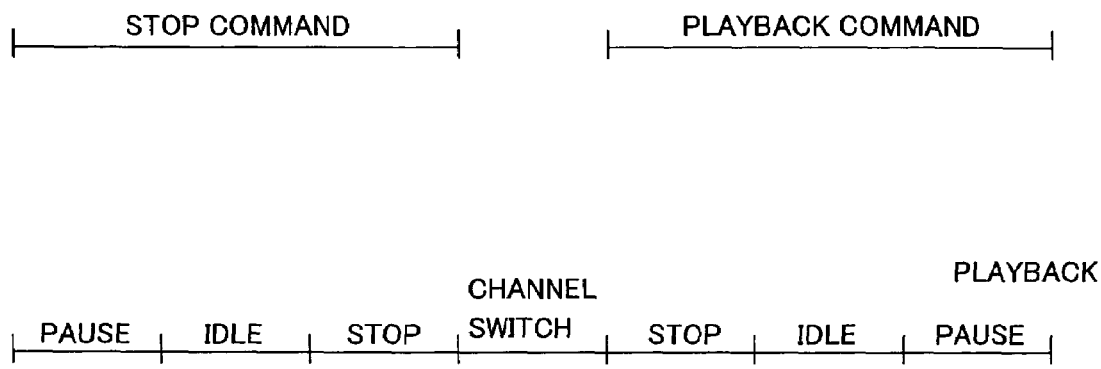
FIG. 3A shows a time sequence illustrating a conventional channel switching operation and FIG. 3B shows a time sequence illustrating the channel switching operation according to the embodiment of the present invention.

According to the conventional method as shown in FIG. 3A, when the channel-switch instruction is issued, a stop command including pause, idle and stop commands is output so as to completely stop HDD 6. Then, after the channel is switched, a playback command including stop, idle and pause commands is output so as to operate HDD 6. A long time (several tens of seconds) is accordingly required for starting a storing operation.

Figure 3B:
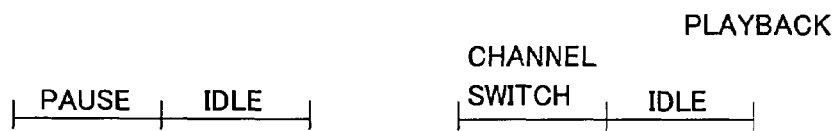
Figure 4:
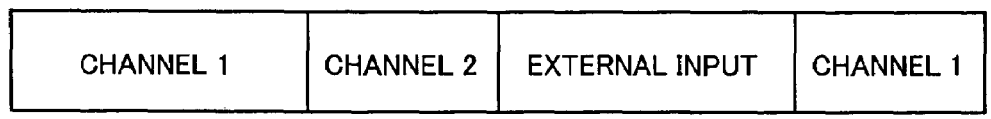
FIG. 4 shows a buffer included in the hard disk recorder.
Figure 5:
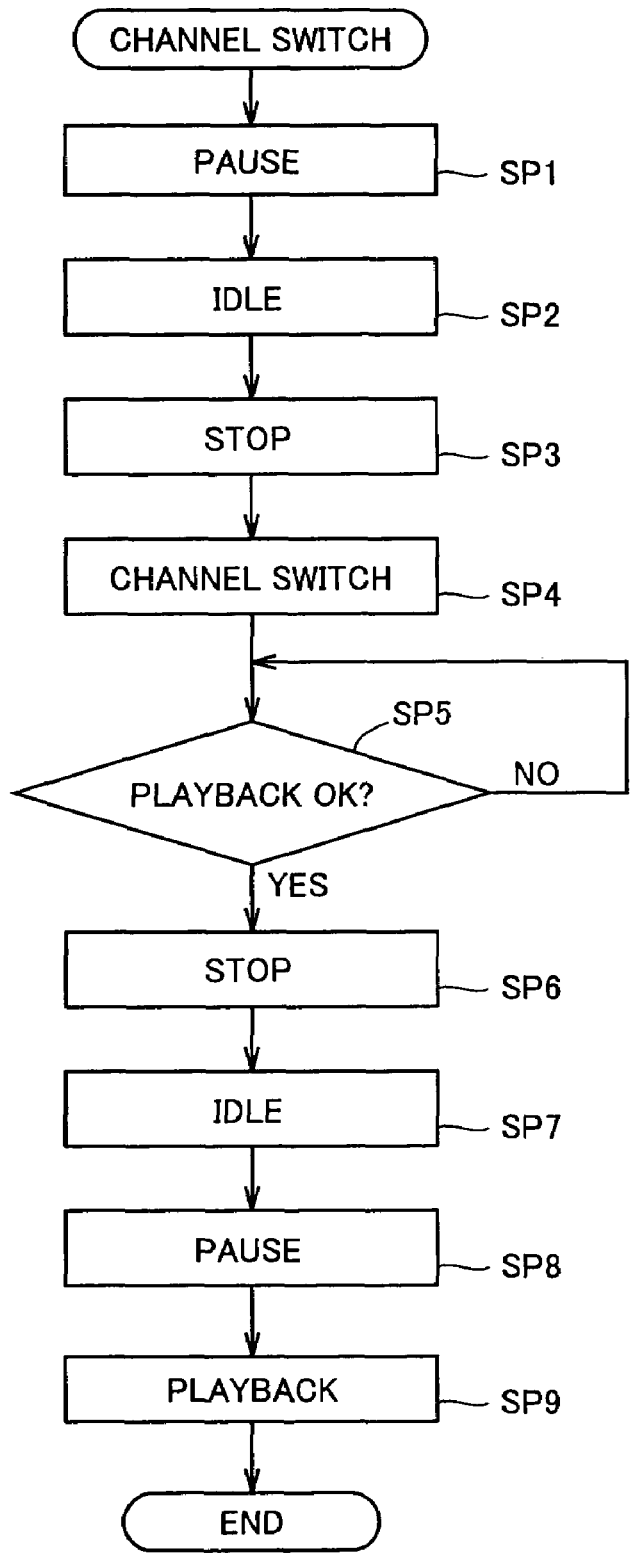
FIG. 5 is a flowchart illustrating a channel switching operation of a conventional hard disk recorder.

According to the present invention as shown in FIG. 3B, when the channel-switch instruction is issued, a transition is made from the pause state to the idle state and thereafter the channel is switched without stopping HDD 6. Then, after it is confirmed that HDD 6 is in the idle state, a playback operation is immediately performed. Here, as HDD 6 is not stopped, the sector address of HDD 6 is not cleared and thus it is known which section the program was lastly played back before the channel was switched. Therefore, it is unnecessary to stop the time-shift playback function. Moreover, the storing operation can be started in approximately 0.1 second.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hard disk recorder having a time-shift playback function of storing a program being received, displaying the stored program such that the program is displayed from a section of the program among stored program sections, and pausing the display of the program or changing the display speed according to an operation by a user while the program is being watched, comprising:
    a hard disk for storing said program being received; and
    a control unit configured to respond to a channel-switch instruction by setting said hard disk in a pause state from which a storing operation can be started, setting said hard disk in a recording-wait state, switching the channel, and, according to a determination that said hard disk is in the recording-wait state, setting said hard disk in a playback state.

2. A hard disk recorder configured to store a program being received and configured to display the stored program, comprising:
    a hard disk for storing said program being received; and
    a control unit configured to respond to a channel-switch instruction by setting said hard disk in a pause state from which a storing operation can be started, setting said hard disk in a recording-wait state, switching the channel, and, according to a determination that said hard disk is in the recording-wait state, setting said hard disk in a playback state.

3. A method of controlling a hard disk of a recorder in response to an instruction to switch a channel, comprising:
    setting the hard disk in a pause state;
    setting the hard disk in a recording-wait state from the pause state;
    switching the channel after setting the hard disk in the recording-wait state;
    determining whether the hard disk is in the recording-wait state; and
    setting the hard disk in a playback state if the hard disk has been determined to be in the recording-wait state.

* * * * *